Oct. 1, 1946.  W. H. LEWIS  2,408,663
STUD OR PROTECTOR FOR BOOTS AND SHOES
Filed Sept. 6, 1945
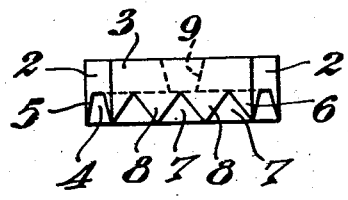
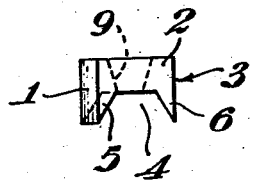
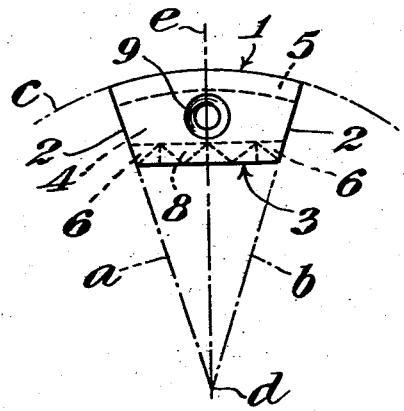
INVENTOR
WILLIAM H. LEWIS Patented Oct. 1, 1946

2,408,663

UNITED STATES PATENT OFFICE 2,408,663

STUD OR PROTECTOR FOR BOOTS AND SHOES

William Howell Lewis, Cwmllynfell, Swansea, South Wales

Application September 6, 1945, Serial No. 614,702
In Great Britain July 17, 1945

2 Claims. (Cl. 36—75)

This invention relates to a stud or protector for boots and shoes for the purpose of reducing wear of the soles or heels of same and concerns a known form of stud comprising a metal block formed on the underface with a channel and adapted to be secured to the article of footwear by screw means passing through the channel so that when the stud has worn down to the base of the channel the remaining portions will fall apart, thereby rendering accessible the projecting screw means to enable same to be easily and readily extracted.

The present invention aims at providing a device having the above characteristic which is so constructed as to be secured by a single screw and which nevertheless will be prevented from rotating by the provision of a series of sharp teeth which can become sufficiently embedded into the sole or heel for this purpose, but which are prevented from penetrating the latter too far by other means provided on the stud. Further the invention aims at providing a stud so shaped that in cutting away a portion of the sole or heel for accommodating the stud it is possible to make the cut along a straight line for ease and convenience whilst nevertheless the outer face of the stud will more or less follow the curvature of the perimeter of the sole or heel.

The stud or protector according to the invention comprises a block shaped to form an outer portion of a sector of a circle, namely a sector truncated by a transverse straight line, said block having on its underside and extending the length thereof a channel-section groove, the inner faces of the walls of which are inclined to form sharp edges in conjunction with the external side faces of the block, and a conical hole in the centre of the block for screw reception, the straight side wall of the block being formed with sharp prongs and the curved side wall being uninterrupted from end to end.

A stud made according to a convenient embodiment of the invention is illustrated in the accompanying drawing, wherein:

Figure 1 is a plan view of the stud,

Figure 2 is an elevation looking at the narrower side of the stud, and

Figure 3 is an end elevation.

The stud shown consists of a metal block shaped to form an outer portion of a sector of a circle contained, as shown in Figure 1, between the radii $a$, $b$ and arc $c$. The curved vertical outer face 1 thus lies on the arc $c$ struck about point $d$ and the vertical ends 2 lie on the radii $a$, $b$ respectively. The other side 3 is straight and normal to a radius $e$ central of the sector and also vertical. Thus the block has the form of a sector truncated by a straight line 3 normal to a radius central of the sector.

On its underside, the block is formed with a groove 4 extending the length of said block, the sides of the groove being curved and straight respectively in correspondence with the outer faces 1 and 3. The inner faces of the walls 5 and 6 at the sides of the groove are inclined so as to diverge towards the base of the block and they meet the outer faces 1 and 3 so as to form sharp edges in conjunction with said outer faces.

The curved side wall 5 of the block is uninterrupted from end to end, that is, preserves a level bottom edge, but the straight side wall 6 is formed with spaced-apart gaps 7 extending right through the thickness of said wall and which are so disposed as to leave a series of sharp prongs 8 in the form of V-shaped teeth.

A single conical hole 9 is formed through the body of the block at its centre and serves to receive a conical-headed screw for securing the device to the sole of a boot or shoe. When the body portion of the device has worn through to the base of the channel 4 and the remainder thus falls away in pieces, the screw will be left protruding from the sole for easy removal.

The single hole fixing ensures easy and rapid fixing of the stud and enables the size of the stud to be kept to small dimensions without weakness that might result from providing more than one hole. Such single-hole fixing is rendered possible by the provision of the sharp prongs 8 which will sufficiently embed themselves into the sole or heel to obviate any possibility of the device rotating about the screw but the prongs 8 will be prevented from penetrating too far by the non-toothed wall 5 bearing upon the sole or heel and being unable to penetrate same to any material extent. The plain form of the wall 5 which is exposed at the perimeter of the sole or heel also will afford a better appearance than if same was of gapped form.

I claim:

1. A stud or protector for boots and shoes comprising a block shaped to form an outer portion of a sector of a circle, namely a sector truncated by a transverse straight line, said block having on its underside and extending the length thereof a channel-section groove the inner faces of the walls of which are inclined to form sharp edges in conjunction with the external side faces of the block, and a conical hole in the centre of the block for screw reception, the straight side wall of the block being formed with sharp prongs and the curved side wall being uninterrupted from end to end.

2. A stud or protector for boots and shoes according to claim 1, having the prongs of the straight wall formed as sharp-pointed V-shaped teeth.

WILLIAM HOWELL LEWIS.